United States Patent
Abraham

(10) Patent No.: US 7,859,454 B2
(45) Date of Patent: Dec. 28, 2010

(54) METHOD AND SYSTEM FOR CALIBRATING GROUP DELAY ERRORS IN A COMBINED GPS AND GLONASS RECEIVER

(75) Inventor: Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 11 days.

(21) Appl. No.: 12/192,963

(22) Filed: Aug. 15, 2008

(65) Prior Publication Data
US 2010/0039321 A1    Feb. 18, 2010

(51) Int. Cl.
*G01S 19/23* (2010.01)
(52) U.S. Cl. ............................................. 342/357.62
(58) Field of Classification Search ............ 342/357.02, 342/357.06, 357.12; 701/213, 215
See application file for complete search history.

(56) References Cited

U.S. PATENT DOCUMENTS

| | | | | |
|---|---|---|---|---|
| 5,949,372 A | * | 9/1999 | Lennen | 342/357.02 |
| 6,229,479 B1 | * | 5/2001 | Kozlov et al. | 342/357.06 |
| 6,266,007 B1 | | 7/2001 | Lennen | |
| 6,608,998 B1 | | 8/2003 | Neumann et al. | |
| 7,221,313 B2 | * | 5/2007 | Ganguly et al. | 342/357.02 |
| 2007/0273580 A1 | | 11/2007 | Tekawy et al. | |

OTHER PUBLICATIONS

European Search Report for European Patent Application Serial No. 09010012.4-2220, dated Nov. 18, 2009.

* cited by examiner

*Primary Examiner*—Dao L Phan
(74) *Attorney, Agent, or Firm*—McAndrews, Held & Malloy, Ltd.

(57) ABSTRACT

Aspects of a method and system for calibrating group delay errors in a combined GPS and GLONASS receiver are provided. The combined GPS and GLONASS receiver may be enabled to receive both GPS signals and GLONASS signals. GPS based navigation information may be calculated based on the received GPS signals. Group delay errors resulted by the received GLONASS signals may be calibrated based on the GPS based navigation information. Respective GLONASS signals may be estimated in responsive to the GPS based navigation information. Corresponding clock information associated with the estimated GLONASS signals may be transferred from the clock information of the GPS based navigation information. A calibration signal may be generated by comparing the estimated GLONASS signals with the received GLONASS signals. The calibration signal may be processed by an error state Kalman filter and may be used to offset the group delay errors in the combined GPS and GLONASS receiver.

24 Claims, 5 Drawing Sheets

METHOD AND SYSTEM FOR CALIBRATING GROUP DELAY ERRORS IN A COMBINED GPS AND GLONASS RECEIVER

CROSS-REFERENCE TO RELATED APPLICATIONS/INCORPORATION BY REFERENCE

Not applicable

FIELD OF THE INVENTION

Certain embodiments of the invention relate to signal processing for navigation satellite systems (NSS). More specifically, certain embodiments of the invention relate to a method and system for calibrating group delay errors in a combined GPS and GLONASS receiver.

BACKGROUND OF THE INVENTION

The Global Positioning System (GPS) and the Global Orbiting Navigation Satellite System (GLONASS) are two Global Navigation Satellite Systems (GNSS). GNSS receivers may normally determine their position by receiving satellite broadcast signals from a plurality of satellites.

A fully operational GPS comprises up to 24 earth orbiting satellites approximately uniformly dispersed around six circular orbits with four satellites each. Each satellite carries a cesium or rubidium atomic clock to provide timing information for the signals transmitted by the satellites. Each GPS satellite transmits L-band carrier signals continuously in two frequency bands centered at 1575.42 MHz and 1227.6 MHz., denoted as L1 and L2 respectively. The GPS L1 signal is quadri-phase modulated by two pseudo-random noise (PRN) codes in phase quadrature, designated as a coarse/acquisition code ("C/A code") and a precision ranging code ("P-code"). The GPS L2 signal is BPSK modulated by only the P-code. The C/A code is a gold code that is specific to each satellite, and has a symbol rate of 1.023 MHz. The unique content of each GPS satellite's C/A code is used to identify the source of a received signal. The P-code, is a relatively long, fine-grained code having an associated clock or chip rate of 10 f0=10.23 MHz. The full P-code has a length of 259 days, with each satellite transmitting a unique portion of the full P-code. The portion of the P-code used for a given GPS satellite has a length of precisely one week (7.000 days) before this code portion repeats. The GPS satellite signals comprise navigational information of the transmitting GPS satellite which may be exploited by a corresponding satellite receiver to determine its own navigation information such as the satellite receiver's position and velocity.

The GLONASS system uses 24 satellites, distributed approximately uniformly in three orbital planes of eight satellites each. The GLONASS system transmits L-band carrier signals continuously in two frequency bands, denoted as L1 and L2, respectively, centered at frequencies of f1=(1.602+ 9k/16) GHz and f2=(1.246+7k/16) GHz, where k (=1, 2, . . . 24) is the channel or satellite number. Each GLONASS satellite transmits signals in frequencies that are specific to each satellite. The GLONASS L1 signal is modulated by a C/A-code with a chip rate=0.511 MHz and by a P-code with a chip rate=5.11 MHz). The GLONASS L2 signal is BPSK modulated by only the P-code. The P-code is the same, and the C/A-code is the same, for each GLONASS satellite. The GLONASS satellite signals comprise navigation information of the transmitting GLONASS satellite which may be exploited by a corresponding satellite receiver to determine its own navigation information such as the satellite receiver's position and velocity.

Both the GPS system and the GLONASS system use transmission of coded radio signals, with the structure described above, from a plurality of Earth-orbiting satellites. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for calibrating group delay errors in a combined GPS and GLONASS receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for calibrating group delay errors in a combined GPS and GLONASS receiver. Various aspects of the invention may provide calibrating received GLONASS signals based on a GPS based navigation for a combined GPS and GLONASS receiver. The combined GPS and GLONASS receiver may be enabled to receive plurality of GPS signals and a plurality of GLONASS signals. GPS navigation information may be calculated solely based on the received plurality of GPS signals. The received plurality of GLONASS signals may be calibrated based on the GPS navigation information. A respective plurality of GLONASS signals may be estimated in response to the GPS navigation information. The clock information of the GLONASS portion of the combined GPS AND GLONASS receiver may be derived from the corresponding GPS associated clock information. A calibration signal used for calibrating the GLONASS portion of the GPS and GLONASS receiver may be generated by comparing the estimated GLONASS signals with the received GLONASS signals. The calibration signal, which may comprise a plurality of calibration coefficients, may be processed via an error state Kalman filter, and used to calibrate the received GLONASS signals.

Figure 1:
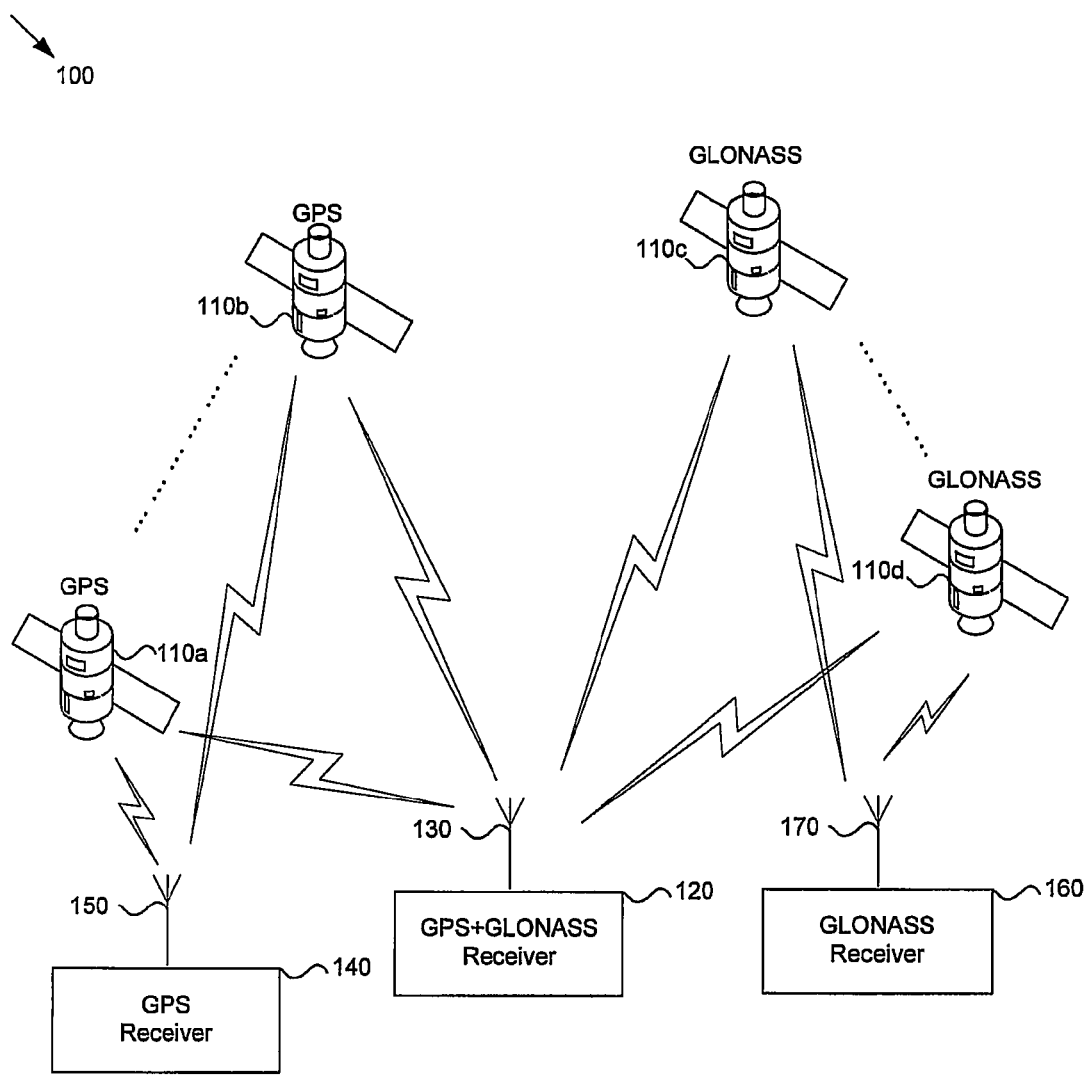
FIG. 1 is a diagram illustrating an exemplary satellite navigation system, in accordance with an embodiment of the invention.

FIG. 1 is a diagram illustrating an exemplary satellite navigation system, in accordance with an embodiment of the invention. Referring to FIG. 1, there is shown a satellite navigation system 100, comprising a combined GPS and GLONASS receiver 120, a GPS receiver 140, a GLONASS receiver 160, and a plurality of satellites, of which satellites 110a, 110b, 110c, and 110d may be illustrated. The combined GPS and GLONASS receiver 120, the GPS receiver 140, and the GLONASS receiver 160 may be communicatively coupled to a receiver antenna 130, a receiver antenna 150, and a receiver antenna 170, respectively.

The satellites 110a through 110d may comprise suitable logic, circuitry and/or code that may be enabled to generate and broadcast suitable radio-frequency (RF) signals that may be received by a satellite receiver, for example, the combined GPS and GLONASS receiver 120, and the GPS receiver 140, and the GLONASS receiver 160. The generated broadcast RF signals may be utilized to determine navigation information such as, for example, the position, the velocity, and the clock information of the combined GPS and GLONASS receiver 120, the GPS receiver 140 and/or the GLONASS receiver 160.

The combined GPS and GLONASS receiver 120 may comprise suitable logic, circuitry and/or code that may be enabled to receive signals broadcasted from both GPS and/or GLONASS satellites, for example, the satellites 110a through 110d. The combined GPS and GLONASS receiver 120 may be enabled to process the received satellite signals to identify the satellite source for each satellite signal, determine the time at which each identified satellite signal arrives at the antenna 130, and determine the present location of the satellite source such as the satellites 110a, 110b, 110c, or 110d. The combined GPS and GLONASS receiver 120 may be capable of tracking a plurality of both the GPS satellites and the GLONASS satellites and take measurements of code and carrier phase from each satellite. The received signals, whether GPS or GLONASS, may be processed by the combined GPS and GLONASS receiver 120 to provide navigation information. The navigation information may be calculated based on the received GPS signals, and/or the received GLONASS signals. Errors such as the group delay error in the received GLONASS signals may be removed based on the GPS based navigation information while maintaining the combined GPS and GLONASS receiver 120 with the specific desirable characteristics such as anti-jamming capabilities. The combined GPS and GLONASS receiver 120 may operate with an initial assumption that the group delay errors for each GLONASS frequency band may be unknown and as a result, may rely solely on the received GPS signals. Once a fix has been obtained on a transmitting GPS satellite, computed GPS navigation information may be used to determine the expected GLONASS signals.

The antenna 130 may comprise suitable logic, circuitry and/or code that may be enabled to receive L band signals from a plurality of GPS satellites and a plurality of GLONASS satellites and pass to the combined GPS and GLONASS receiver 120 to be processed for corresponding navigation information. Although a single antenna 130 is illustrated, the invention may not be so limited. Accordingly, one or more antennas may be utilized by the combined GPS and GLONASS receiver 120 without departing from the spirit and scope of various embodiments of the invention.

The GPS receiver 140 may comprise suitable logic, circuitry and/or code that may be operable to receive signals broadcasted from GPS satellites, for example, the satellites 110a. The GPS receiver 140 may be enabled to process the received satellite signals to identify the satellite source for each satellite signal, and determine the time at which each identified satellite signal arrives at the antenna 150. The GPS receiver 140 may also be operable to determine a present location of the satellite source such as the satellites 110a and 110b. The GPS receiver 140 may be capable of tracking a plurality of the GPS satellites and may take measurements of code and/or carrier phase from each GPS satellite. The received GPS signals may be processed by the GPS receiver 140 to provide navigation information. The navigation information may be calculated based on the received GPS signals.

The antenna 150 may comprise suitable logic, circuitry and/or code that may be enabled to receive L band signals from a plurality of GPS satellites and communicate them to the GPS receiver 140 where they may be processed to generate corresponding navigation information.

The GLONASS receiver 160 may comprise suitable logic, circuitry and/or code that may be operable to receive signals broadcasted from GLONASS satellites, for example, the satellites 110c. The GLONASS receiver 160 may be enabled to process the received satellite signals to identify the satellite source for each satellite signal, determine the time at which each identified satellite signal arrives at the antenna 170, and determine the present location of the satellite source such as the satellites 110c and 110d. The GLONASS receiver 160 may be capable of tracking a plurality of the GLONASS satellites and may take measurements of code and/or carrier phase from each GLONASS satellite. The received GLONASS signals may be processed by the GLONASS receiver 160 to provide navigation information. The navigation information may be determined based on the received GLONASS signals.

The antenna 170 may comprise suitable logic, circuitry and/or code that may be enabled to receive L band signals from a plurality of GLONASS satellites and communicate them to the GLONASS receiver 160 where they may be processed to generate corresponding navigation information.

In operation, the combined GPS and GLONASS receiver 120 may receive a plurality of satellite signals from GPS satellites such as 110a and 110b, and GLONASS satellites such as 110c and 110d. The combined GPS and GLONASS receiver 120 may be enabled to identify the satellite source for each satellite signal. For example, each GLONASS satellite may be identified by its satellite vehicle identification number (SV.sub.-ID) acquired from the GLONASS almanac data which may be related to the carrier transmission frequency of a particular GLONASS satellite. Each GPS satellite may be identified by matching or correlating a unique portion of the GPS P-code for that particular satellite. Once a synchronization or lock has been successfully established on the transmitting GPS satellites and GLONASS satellites, the combined GPS and GLONASS receiver 120 may take code and carrier phase measurements on each identified satellite signals, GPS and/or GLONASS, received via the antenna 130.

The combined GPS and GLONASS receiver 120 may be operable to process the received GPS signals and generate GPS navigation information for the combined GPS and GLONASS receiver 120. Respective GLONASS signals may be estimated based on the GPS navigation information and a calibration signal that may be reflective of group delay variations associated with the received GLONASS signals. The calibration signal may be derived based on a comparison of the estimated GLONASS signal and actual received GLONASS signals. The calibration signal may be used to calibrate the received GLONASS signals by offsetting associated group delay errors. GLONASS based navigation information may be calculated based on the calibrated GLONASS signals. The combined GPS and GLONASS receiver 120 may operable to generate the GPS based navigation information, the GLONASS based navigation information, and/or a combined version of the GPS navigation information and the GLONASS navigation information.

Many applications such as car navigation, aircraft navigation, and scientific applications may benefit from use of both systems in the same satellite receiver. A combined GPS and GLONASS receiver may provide a high degree of system-wide integrity. For example, if either the GPS or the GLONASS suffers a system-wide failure then the combined GPS and GLONASS satellite receiver will continue to operate with the remaining GPS or GLONASS operational systems. When both the GPS system and the GLONASS systems are operational, measurements from each of them may be continually compared in order to detect the system-wide failures. The system-wide failure includes not only the satellite failing in some manner, but also includes operating in environments where heavy radio frequency interferences may be present. The radio interferences affecting one system need not affect the other system because GPS and GLONASS operate in different frequency bands. Code phase (also known as pseudo-range) measurements are commonly processed in combined GPS and GLONASS receivers to provide high accuracy position, velocity and time measurements. Depending on implementation, it may be desirable for a combined GPS and GLONASS receiver to include specific filter and amplifier components to prevent, for example, possible jamming. The specific characteristics of filters, amplifiers and other active components in the combined GPS and GLONASS receiver design may cause group delay distortion, which is the variations in group delay across the received bandwidth, and may result in error in code phase measurements.

Figure 2:
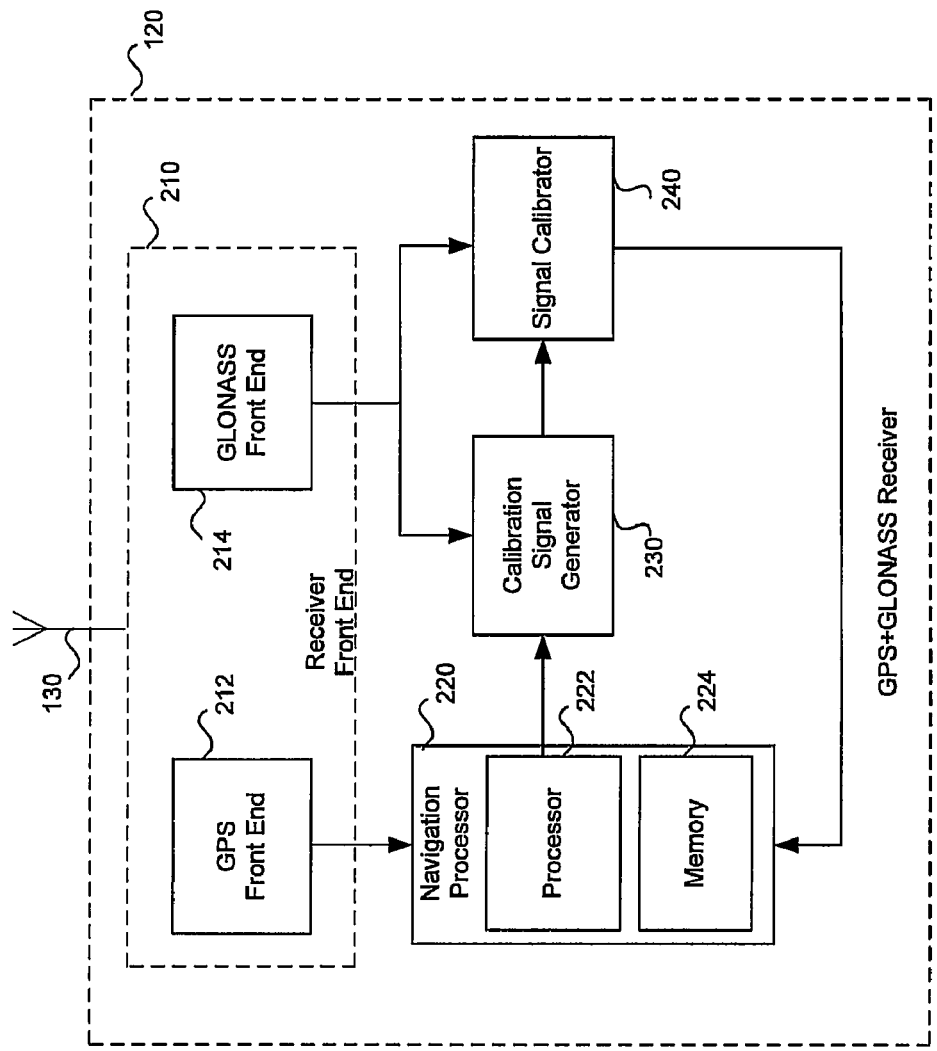
FIG. 2 is a diagram illustrating an exemplary combined GPS and GLONASS receiver, in accordance with an embodiment of the invention.

FIG. 2 is a diagram illustrating an exemplary combined GPS and GLONASS receiver, in accordance with an embodiment of the invention. Referring to FIG. 2, there is shown a combined GPS and GLONASS receiver 120, comprising a receiver front end 210, a navigation processor 220, a calibration signal generator 230, and a signal calibrator 240. The receiver front end 210 may comprise a GPS front end 212 and a GLONASS front end 214. The navigation processor 220 may comprise a processor 222 and a memory 224. The combined GPS and GLONASS receiver 120 may be communicatively coupled to the receiver antenna 130. Although a single antenna is illustrated, the invention may not be so limited. Accordingly, one or more antennas may be utilized by the combined GPS and GLONASS receiver 120 without departing from the spirit and scope of various embodiments of the invention.

The receiver front end 210 may comprise suitable logic, circuitry and/or code that may be enabled to receive satellite broadcast signals via the receiver antenna 130 and process them so as to generate baseband signals, which may be suitable for further processing in the combined GPS and GLONASS receiver 120.

The GPS front end 212 may comprise suitable logic, circuitry and/or code that may be enabled to receive GPS satellite broadcast signals via the receiver antenna 130 and convert them to GPS baseband signals, which may be suitable for further processing in the combined GPS and GLONASS receiver 120 for navigation information, whether GPS based or combined GPS and GLONASS based.

The GLONASS front end 214 may comprise suitable logic, circuitry and/or code that may be enabled to receive GLONASS satellite broadcast signals via the receiver antenna 130 and convert them to GLONASS baseband signals, which may be suitable for further processing in the combined GPS and GLONASS receiver 120 for navigation information, whether GLONASS based or combined GPS and GLONASS based.

The navigation processor 220 may comprise suitable logic, circuitry and/or code that may be enabled to process received satellite signals via the receiver front end 210 and extract information for each received satellite signal to provide navigation information for the combined GPS and GLONASS receiver 120.

The processor 222 may comprise suitable logic, circuitry and/or code that may be operable to determine navigation information from the received satellite signals that are processed by the corresponding GLONASS front end 210 and GPS front end 212. The navigation information may be a GPS based or a GLONASS based. The processor 222 may use various algorithms to combine the GPS based information and the GLONASS based navigation information into combined navigation information. The combined navigation information may be generated by removing errors such as the group delay error from the received GLONASS signals based on the GPS based navigation information.

The memory 224 may comprise suitable logic, circuitry, and/or code that enable storing information such as executable instructions and data that may be utilized by the processor 222. The executable instructions may comprise algorithms that may be enabled to calculate navigation information using the acquired satellite signals automatically or upon request/signaled. The data may comprise a calibration signal comprising various calibration coefficients that may be used for calibrating the received GLONASS signals. The memory 224 may comprise RAM, ROM, low latency nonvolatile memory such as flash memory and/or other suitable electronic data storage.

The calibration signal generator 230 may comprise suitable logic, circuitry, and/or code that may enable generation of a calibration signal, comprising plurality of calibration coefficients. The calibration signal generator 230 may convert GPS based navigation information into corresponding GLONASS navigation information. An expected GLONASS signal associated with the corresponding GLONASS navigation information may be estimated. The expected GLONASS signals may be compared to the actual received GLONASS signals at the calibration signal generator 230 to determine group delay errors for each received GLONASS signal. These group delay errors may be used as calibration coefficients of the generated calibration signal to be communicated to the signal calibrator 240 to calibrate the received GLONASS signals by dynamically offsetting corresponding group delay errors in the received GLONASS signals.

The signal calibrator 240 may comprise suitable logic, circuitry, and/or code that may be configured to remove associated group delay errors from the received GLONASS signals by combining the received GLONASS signals with a calibration signal from the calibration signal generator 230. The signal calibrator 240 may communicate the calibrated GLONASS signals with the navigation processor 220 to produce GLONASS based navigation information or combined GPS and GLONASS based navigation information.

In operation, a plurality of satellite signals from GPS satellites such as 110*a* and 110*b*, and GLONASS satellites such as 110*c* and 110*d* may be received at the antenna 130 of the combined GPS and GLONASS receiver 120. The combined GPS and GLONASS receiver 120 may be enabled to identify and determine the satellite source for each satellite signal. Depending on the type of received satellite signals, the received satellite signals may be measured at the antenna 130 and communicated to the GPS front end 212 or the GLONASS front end 214, respectively. The received GPS signals may be demodulated and converted to baseband signals via the GPS front end 212 and communicated to the navigation processor 220. The processor 222 in the navigation processor 220 may use various algorithms stored in the memory 224 to calculate GPS navigation information for the combined GPS and GLONASS receiver 120. The resulting GPS navigation information may be communicated to the calibration signal generator 230. The calibration signal generator 230 may be operable to estimate the GLONASS signals based on the GPS based navigation information. The estimated GLONASS signals may be compared to the actual GLONASS signals at the calibration signal generator 230. The resulting errors such as group delay errors for each of the GLONASS signals may be determined. These group delay errors may be used to generate a calibration signal, which may be communicated to the signal calibrator 240. The signal calibrator 240 may be operable to calibrate, in real time, the received GLONASS signals by offsetting the group delay errors in GLONASS signals.

Figure 3:
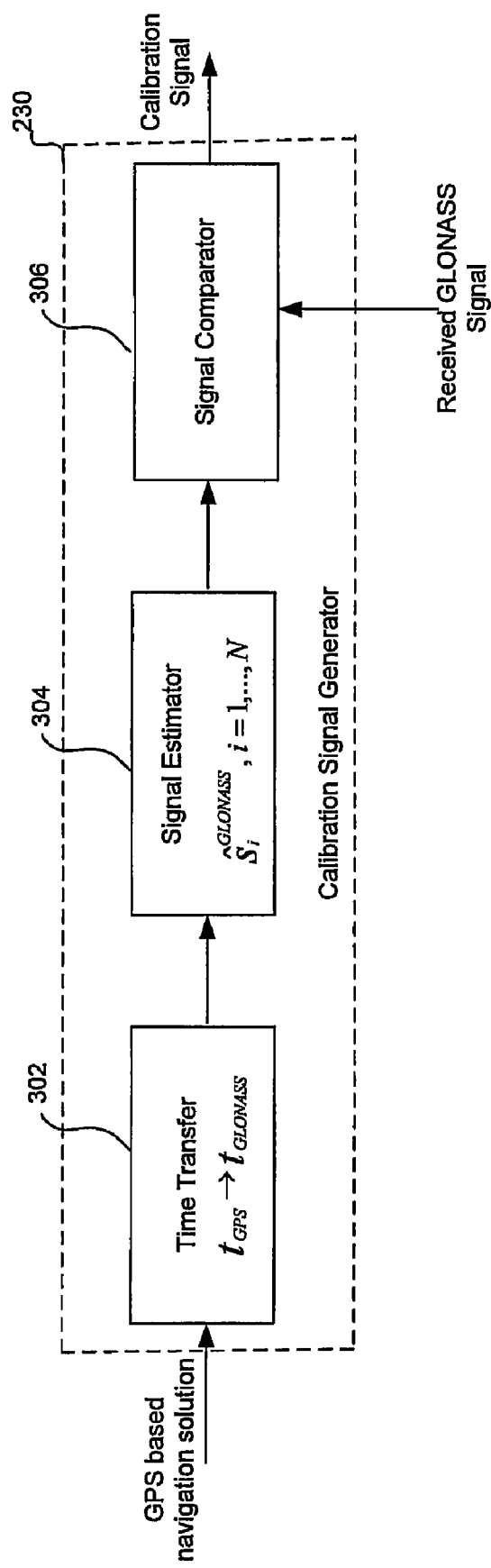
FIG. 3 is a diagram illustrating an exemplary calibration signal generator, in accordance with an embodiment of the invention.

FIG. 3 is a diagram illustrating an exemplary calibration signal generator, in accordance with an embodiment of the invention. Referring to FIG. 3, there is shown a calibration signal generator 230 comprising a time transfer 302, a signal estimator 304, and a signal comparator 306.

The time transfer 302 may comprise suitable logic, circuitry, and/or code that may enable taking a receiver clock offset determined by a GPS based navigation solution and adding GPS-GLONASS system time reference bias to it.

The signal estimator 304 may comprise suitable logic, circuitry, and/or code that may enable estimation of GLONASS signals corresponding to given navigation information. The clock information associated to the estimated GLONASS signals may be the transferred receiver clock offset from the time transfer 302.

The signal comparator 306 may comprise suitable logic, circuitry, and/or code that may enable comparing the estimated GLONASS signals with actual received GLONASS signals to generate, for example, group delay errors for each received GLONASS signal. The resulting group delay errors may be outputted as calibration coefficients to the signal calibrator 240.

In operation, GPS based navigation information for the combined GPS and GLONASS receiver 120 may be calculated by the navigation processor 220 based on the demodulated received GPS signals and pass to the calibration signal generator 230. The clock information associated with the GPS based navigation information may be extracted at the time transfer 302 and may be transferred to a corresponding GLONASS receiver clock offset from the GLONASS satellite system. The signal estimator 304 may estimate respective GLONASS signals corresponding to the GPS navigation information with the transferred GLONASS receiver clock offset. The signal comparator 306 may compare each of the received GLONASS signal with the respective estimated GLONASS signal. Based on the comparison, corresponding group delay errors may be generated by the signal comparator 306 for each received GLONASS signal. The corresponding generated group delay errors may be outputted as a calibration signal from the calibration signal generator 230 and utilized to calibrate the group delay errors for the received GLONASS signals.

Figure 4:
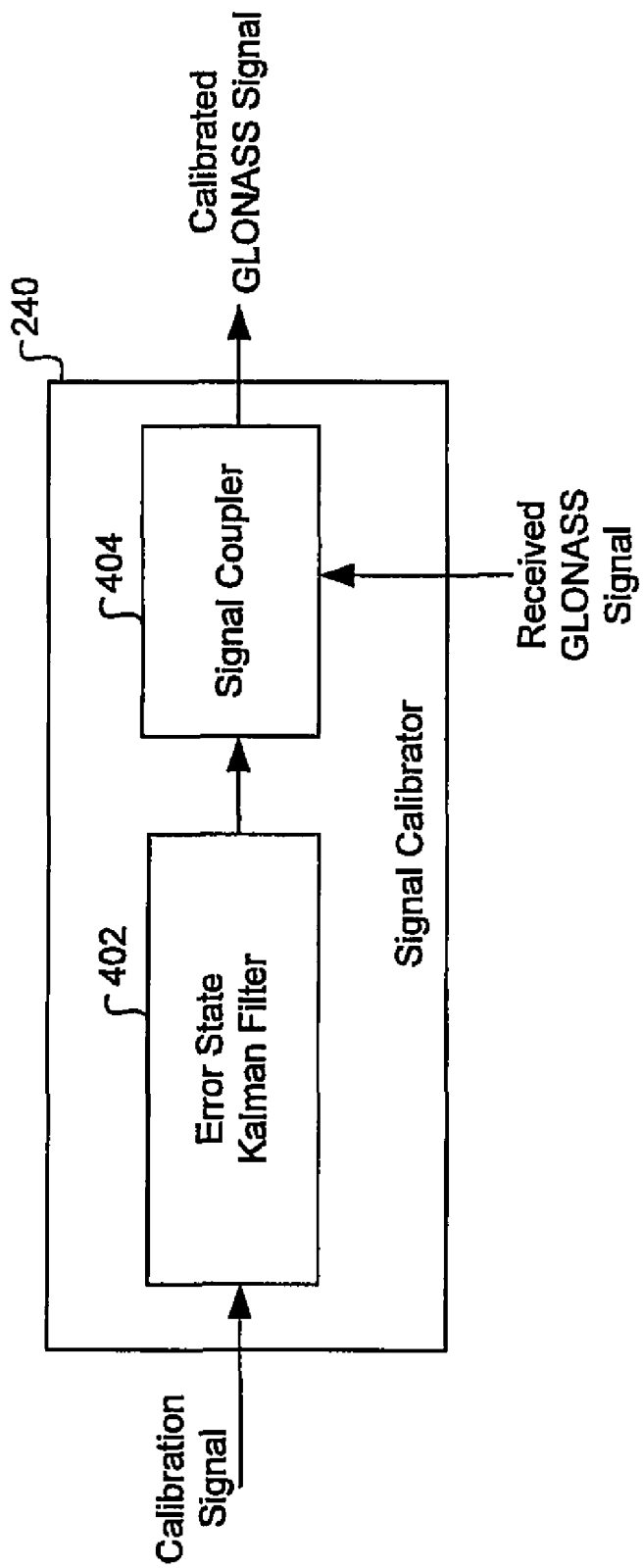
FIG. 4 is a diagram illustrating an exemplary error state Kalman filter used in a combined GPS and GLONASS receiver, in accordance with an embodiment of the invention.

FIG. 4 is a diagram illustrating an exemplary error state Kalman filter used in a combined GPS and GLONASS receiver, in accordance with an embodiment of the invention.

Referring to FIG. 4, there is shown a signal calibrator 240, comprising an error state Kalman filter 402 and a signal coupler 404.

The signal calibrator 240 may comprise suitable logic, circuitry, and/or code that may be operable to improve or optimize the accuracy of received GLONASS signals by removing associated group delay errors.

The error state Kalman filter 402 may comprise suitable logic, circuitry, and/or code that may be configured to provide an optimized estimate of group delay variations in received GLONASS signals at the combined GPS and GLONASS receiver 120 in real time. The error state Kalman filter 402 may indicate how quickly the group delay variations in the received GLONASS signals may stabilize. The error state Kalman filter 402 may produce an adaptive adjustment to be used for offsetting the group delay variations in the received GLONASS signals. Error states associated with the error state Kalman filter 402 may be defined and may comprise group delay errors from each received GLONASS signal at the combined GPS and GLONASS receiver 120. Initially the group delay errors may be substantially unknown and may be estimated to be zero, for example. This may indicate that the error state Kalman filter 402 may make little use of GLONASS measurements for navigation. As the filtering process may continue, the group delay errors may become known, the error state Kalman filter 402 may make substantially use of the GLONASS measurements for navigation. The error state Kalman filter 402 may ensure gradual changes in the group delay errors. The error state Kalman filter 402 may continuously update the calibration coefficients while simultaneously making use of them.

The signal coupler 404 may comprise suitable logic, circuitry, and/or code that may be operable to combine the actual received GLONASS signal with estimated group delay variations from the error state Kalman filter 402 in order to produce respective calibrated GLONASS signals. The group delay errors in the received GLONASS signals may be offset and/or removed by the signal coupler 404. The signal coupler 404 may be operable to communicate the calibrated GLONASS signals to the navigation processor 220 in the combined GPS and GLONASS receiver 120. The processor 222 may utilize the calibrated GLONASS signals to generate GLONASS related navigation information.

The error state Kalman filter 402 may be implemented in various ways without departing from the scope of the various embodiments of the invention. For example, the calibration information from the error state Kalman filter 402 may be applied outside the error state Kalman filter 402 as described with respect to FIG. 4. The calibration information may also be fed back to the error state Kalman filter 402 for computing a solution.

Figure 5:
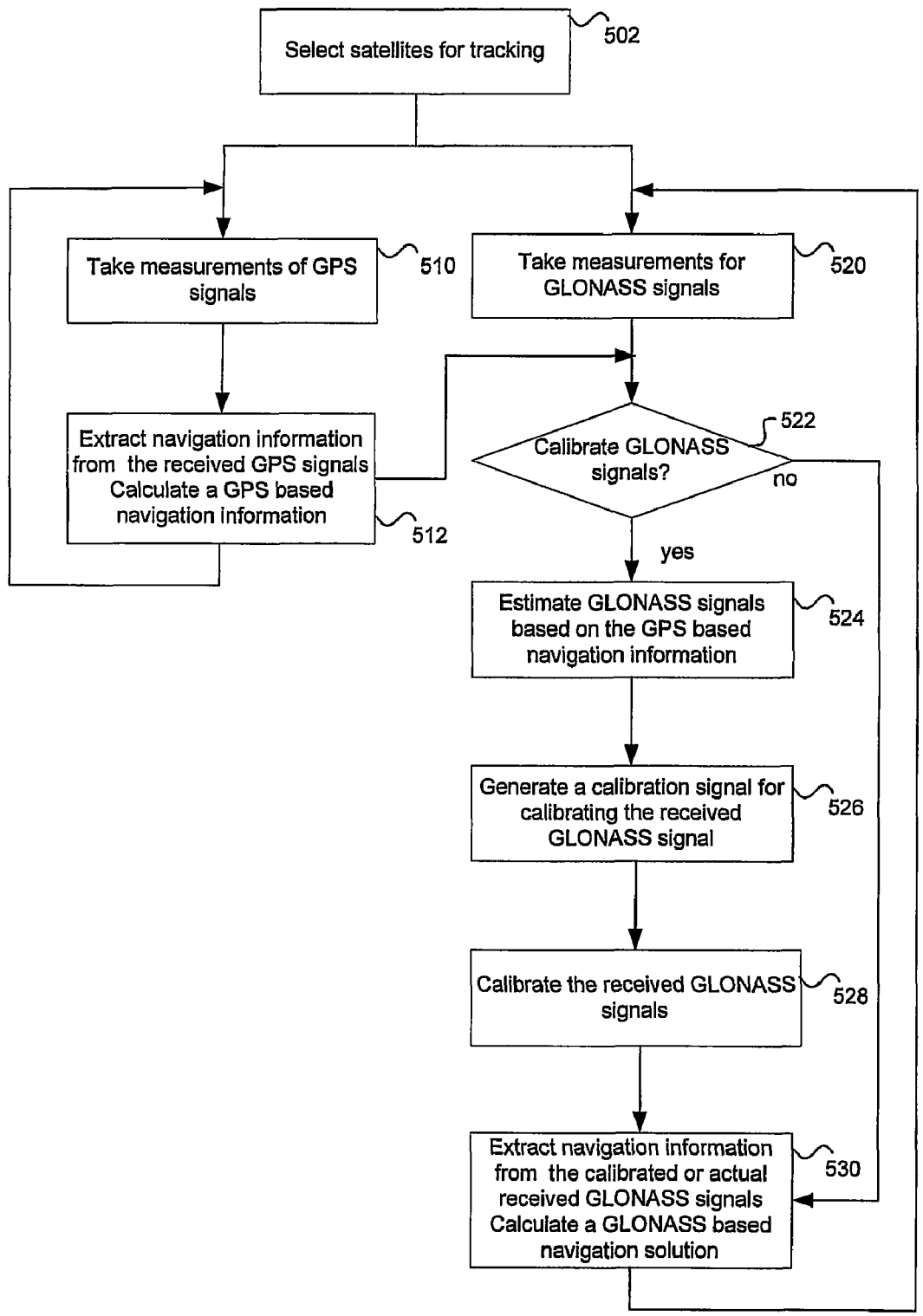
FIG. 5 is a flow chart illustrating exemplary steps for calibrating group delay errors in a combined GPS and GLONASS receiver, in accordance with an embodiment of the invention.

FIG. 5 is a flow chart illustrating exemplary steps for calibrating group delay errors in a combined GPS and GLONASS receiver, in accordance with an embodiment of the invention. Referring to FIG. 5, the exemplary steps may begin with step 502, where the combined GPS and GLONASS receiver 120 may select satellites for tracking. In step 510, the combined GPS and GLONASS receiver 120 may start taking measurements for the received GPS signals from the corresponding GPS satellites. In step 512, the combined GPS and GLONASS receiver 120 may extract navigation information from the received GPS signals. The extracted navigation information may be communicated to the navigation processor 220 to produce a GPS based navigation information for the combined GPS and GLONASS receiver 120, the process may proceed in step 510 and/or step 522.

In step 520, the combined GPS and GLONASS receiver 120 may start taking measurements for the received GLONASS signals from the corresponding GLONASS satellites. In step 522, it may be determined whether the received GLONASS signals should be calibrated. In instances where the received GLONASS signals may need to be calibrated for offsetting variations in associated group delay errors, then in step 524, the GLONASS signals may be estimated based on the GPS based navigation information calculated in step 512. In step 526, a calibration signal comprising calibration coefficients for calibrating the received GLONASS signals may be generated. In step 528, the received GLONASS signals may be calculated based on the generated calibration signal. In step 530, navigation information from the calibrated GLONASS signals may be extracted and GLONASS based navigation information may be determined based on the calibrated GLONASS signals. The exemplary steps may then return to step 520. In step 522, in instances where the received GLONASS signals may not need to be calibrated, then in step 530, GLONASS navigation information may be determined based on the actual received GLONASS signals. The exemplary steps may then return to step 520.

Aspects of a method and system for calibrating group delay errors in a combined GPS and GLONASS receiver are provided. In accordance with various embodiments of the invention, the combined GPS and GLONASS receiver 120 may be enabled to receive plurality of GPS signals and plurality of GLONASS signals via the antenna 130. The navigation processor 220 in the combined GPS and GLONASS receiver 220 may calculate a GPS based navigation information based on the received GPS signals. The received plurality of GLONASS signals may be calibrated based on the GPS based navigation information. The signal estimator 304 may generate an estimate for each of a plurality of GLONASS signals based on the GPS based navigation information. The clock information associated with the GPS based navigation information may be transferred at the time transfer 302 to the corresponding clock information from the GLONASS satellite system. The transferred clock information may be used for the estimation of each of the plurality of GLONASS signals at the signal estimator 304. In the signal comparator 306, the estimated plurality of GLONASS signals may be compared with the corresponding received plurality of GLONASS signals to produce a calibration signal comprising a plurality of calibration coefficients. The calibration signal may be communicated to the signal calibrator 240 to offset the group delay errors in the received plurality of GLONASS signals. The calibration signal may be processed by the error state Kalman filter 402 and may be used to calibrate the received plurality GLONASS signals.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for calibrating group delay errors in a combined GPS and GLONASS receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising receiving a plurality of GPS signals and a plurality of GLONASS signals;
   determining GPS navigation information for said plurality of GPS signals; and
   calibrating one or more of said plurality of GLONASS signals based on said determined GPS navigation information.

2. The method according to claim 1, comprising generating estimates of one or more of said plurality of GLONASS signals based on said determined GPS navigation information.

3. The method according to claim 2, comprising estimating one or more of said plurality of GLONASS signal utilizing GPS receiver clock information from said determined GPS navigation information.

4. The method according to claim 2, comprising comparing one or more estimated GLONASS signals to one or more of said received plurality of GLONASS signals.

5. The method according to claim 4, comprising generating a calibration signal based on said comparison.

6. The method according to claim 5, comprising calibrating one or more of said received plurality of GLONASS signals utilizing said generated calibration signal.

7. The method according to claim 6, comprising processing said generated calibration signal by a Kalman filter prior to said calibrating.

8. The method according to claim 5, comprising calibrating group delay errors in said received plurality of GLONASS signals utilizing said generated calibration signal.

9. A system for processing signals, the system comprising:
   one or more circuits operable to receive a plurality GPS signals and a plurality of GLONASS signals;
   said one or more circuits operable to determines GPS navigation information for said plurality of GPS signals; and
   said one or more circuits operable to calibrate one or more of said plurality of GLONASS signals based on said determined GPS navigation information.

10. The system according to claim 9, wherein said one or more circuits are operable to generate estimates of one or more of said plurality of GLONASS signals based on said determined GPS navigation information.

11. The system according to claim 10, wherein said one or more circuits are operable to estimate one or more of said plurality of GLONASS signal utilizing GPS receiver clock information from said GPS navigation information.

12. The system according to claim 10, wherein said one or more circuits are operable to compare one or more estimated GLONASS signals to one or more of said received plurality of GLONASS signals.

13. The system according to claim 12, wherein said one or more circuits are operable to generate a calibration signal based on said comparison.

14. The system according to claim 13, wherein said one or more circuits are operable to calibrate one or more of said received plurality of GLONASS signals utilizing said generated calibration signal.

15. The system according to claim 14, wherein said one or more circuits comprises a calibration Kalman filter operable to process said generated calibration signal prior to said calibrating.

16. The system according to claim 13, wherein said one or more circuits are operable to calibrate group delay errors in said received plurality of GLONASS signals utilizing said generated calibration signal.

17. A machine-readable storage having stored thereon, a computer program having at least one code section for providing signal processing, the at least one code section being executable by a machine for causing the machine to perform steps comprising:
  receiving a plurality GPS signals and a plurality of GLONASS signals;
  determining GPS navigation information for said plurality of GPS signals; and calibrating one or more of said plurality of GLONASS signals based on said determined GPS navigation information.

18. The machine-readable storage according to claim 17, wherein said at least one code section comprises code for generating estimates of one or more of said plurality of GLONASS signals based on said determined GPS navigation information.

19. The machine-readable storage according to claim 18, wherein said at least one code section comprises code for estimating one or more of said plurality of GLONASS signal utilizing GPS receiver clock information from said GPS navigation information.

20. The machine-readable storage according to claim 18, wherein said at least one code section comprises code for comparing one or more estimated GLONASS signals to one or more of said received plurality of GLONASS signals.

21. The machine-readable storage according to claim 20, wherein said at least one code section comprises code for generating a calibration signal based on said comparison.

22. The machine-readable storage according to claim 21, wherein said at least one code section comprises code for calibrating one or more of said received plurality of GLONASS signals utilizing said generated calibration signal.

23. The machine-readable storage according to claim 22, wherein said at least one code section comprises code for processing said generated calibration signal by a Kalman filter prior to said calibrating.

24. The machine-readable storage according to claim 21, wherein said at least one code section comprises code for calibrating group delay errors in said received plurality of GLONASS signals utilizing said generated calibration signal.

* * * * *